Sept. 18, 1956 I. V. K. HOTT 2,763,128
LOW LEVEL OIL CONTROL FOR HYDRAULIC LIFTING MECHANISM
Filed Dec. 8, 1952 3 Sheets-Sheet 3
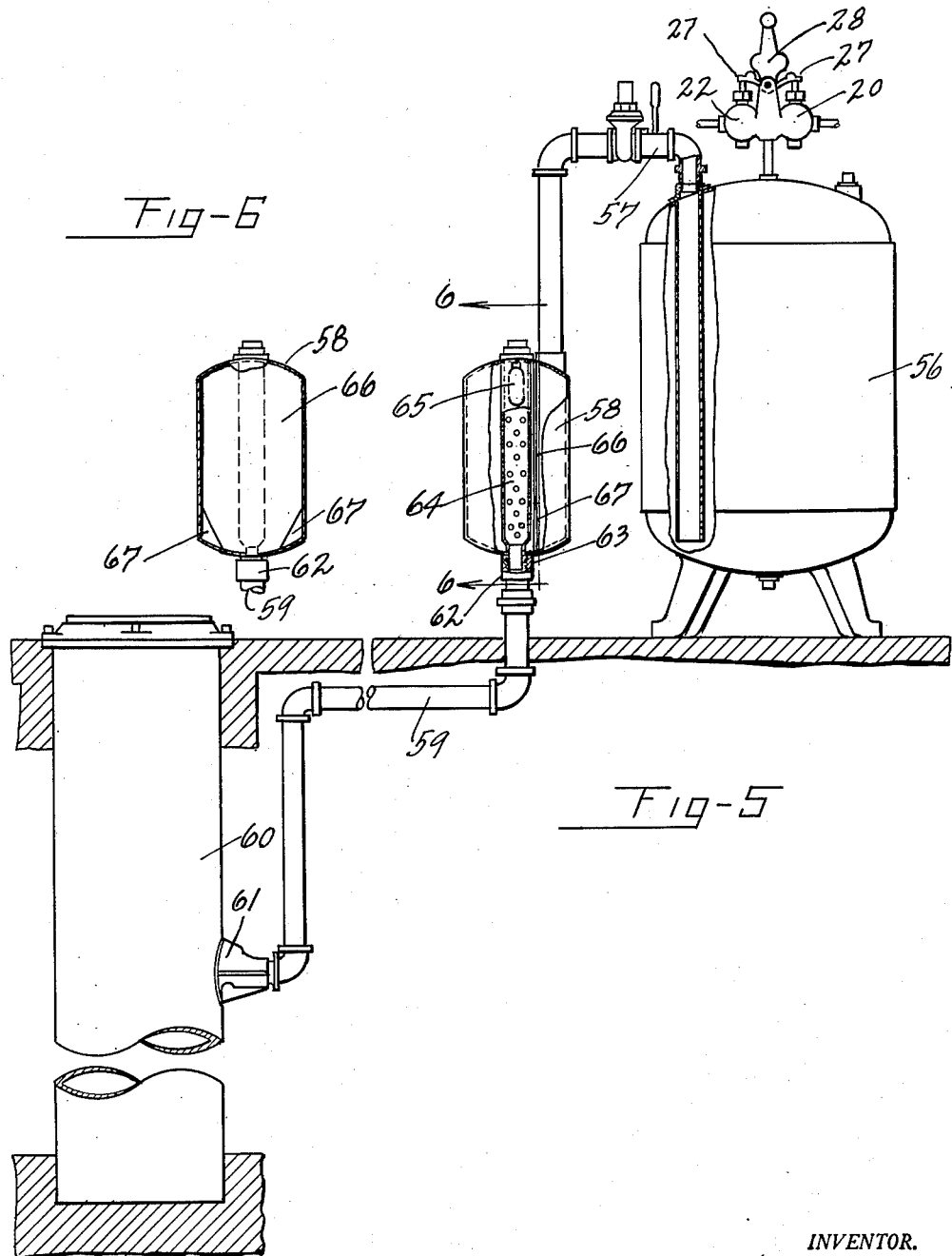
INVENTOR.
ION V. K. HOTT
BY
ATTORNEY

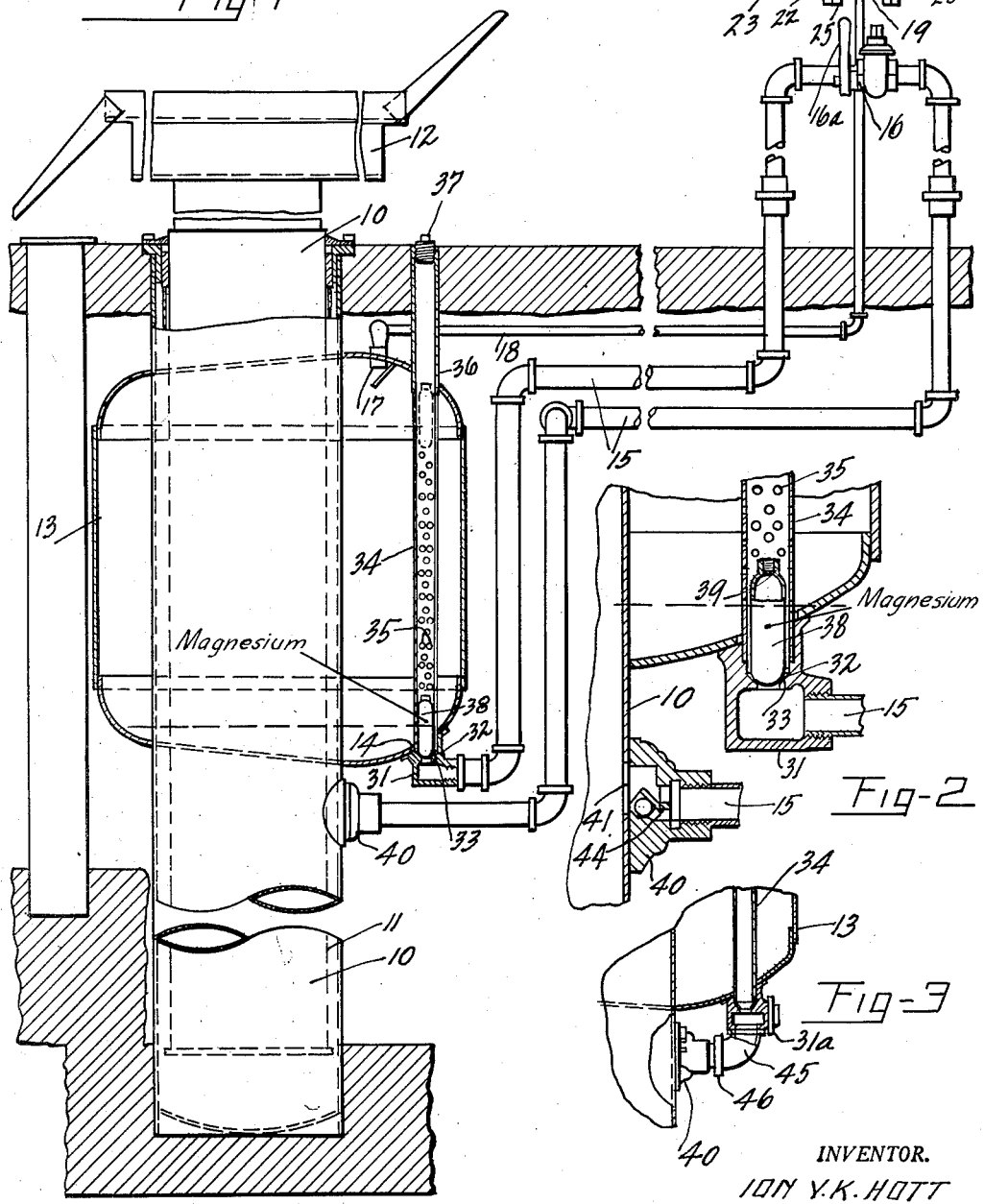
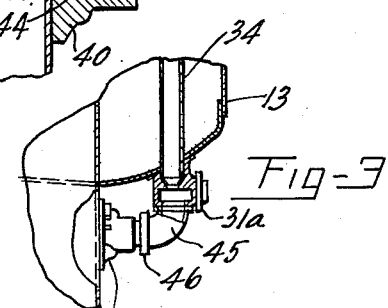

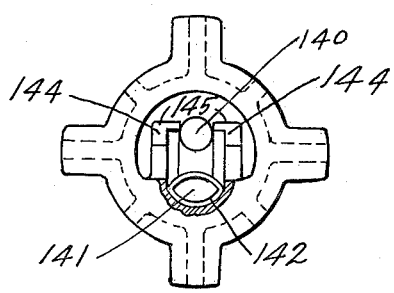
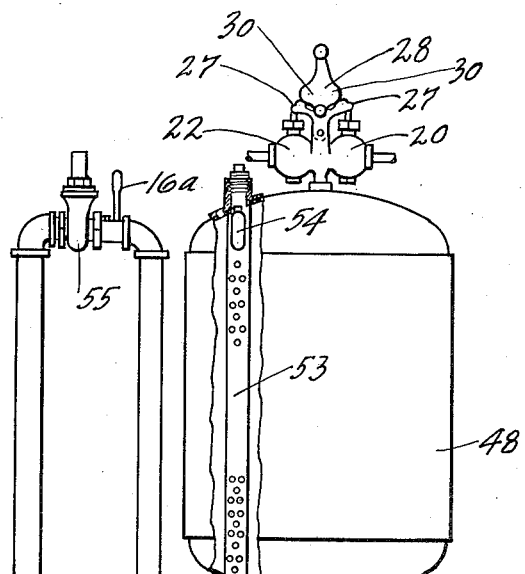
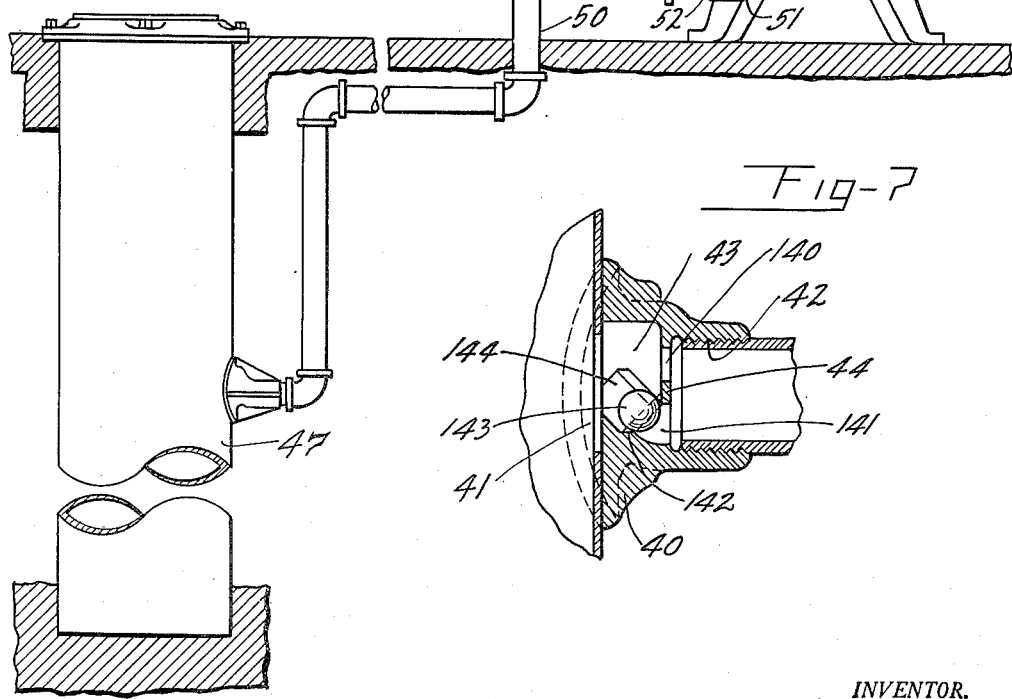
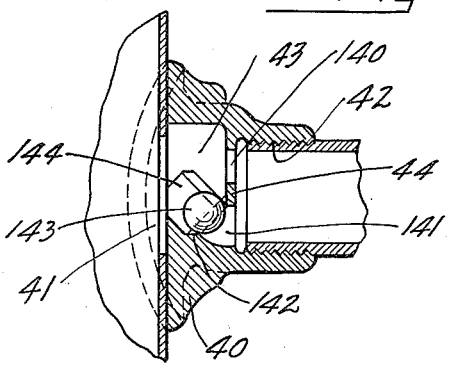

United States Patent Office 2,763,128
Patented Sept. 18, 1956

2,763,128

LOW LEVEL OIL CONTROL FOR HYDRAULIC LIFTING MECHANISM

Ion V. K. Hott, Dayton, Ohio, assignor to The Joyce-Cridland Company, Dayton, Ohio, a corporation of Ohio Application December 8, 1952, Serial No. 324,755

14 Claims. (Cl. 60—51)

This invention relates to a low level oil control for hydraulic lifting mechanisms.

This is a continuing application of my copending application Serial No. 826, filed January 7, 1948, for Low Level Oil Control for Hydraulic Lifting Mechanism, now formally abandoned without prejudice in favor of the present application.

In many hydraulic lifting mechanisms, such as automobile lifts, it is customary to deliver the oil, or other propellant liquid, from a container to the cylinder of the lift by subjecting the oil in the container to air pressure. Normally the container contains a quantity of oil ample to move the piston of the lift to the limit of its upward movement; but due to leakage, or other causes, the quantity of oil in the container may sometimes be so reduced that it will be exhausted before the piston is fully extended. When this happens, air under pressure enters the cylinder and passes through the oil therein into direct contact with the piston. The air being under high pressure moves the piston to the outer limit of its movement at an undesirable high speed and the air being compressible provides an unstable support for the piston and the load thereon. Moreover, when the oil control valve is opened to lower the piston, the oil is first discharged from the cylinder and the air is then discharged at a much faster rate than the oil, and the piston is lowered at a speed so high as to be dangerous, particularly when a relatively large amount of air has entered the cylinder.

One object of the invention is to provide a simple, highly efficient and automatic low level oil control for preventing air from passing from the oil container to the cylinder.

A further object of the invention is to provide a low level oil control of such a character that it may be installed in the hydraulic lifting mechanisms of various kinds.

A further object of the invention is to provide a low level oil control which can be produced and installed in an oil container at a low cost.

Another object of this invention is to provide a float that has sufficient buoyancy so that it will float on top of the oil, even through there is a down current of the oil directly below the float and at the same time provide a float that will withstand the pressures used in a hydraulic lift. This has been accomplished by utilizing a hollow magnesium float that has the desired buoyancy and, at the same time, sufficient strength so as to prevent the float from collapsing when in use. In float valves used in hydraulic lifts, there are several unusual problems. The float must be suspended on top of the oil directly above the valve. When the oil is caused to flow outwardly and downwardly through the valve opening, the downwardly flowing oil causes a suction under the float. This, together with the weight of the air, which is quite considerable when the air is under high pressures, requires a very light weight float. Furthermore, the extremely high pressures require a float that has strong walls. In addition thereto, it is desirable to have a float that has cylindrical-shaped walls, rather than spherical, resulting in a structure that is not as strong as though the walls could be made in the form of a perfect sphere.

Other objects and advantages reside in the construction of parts, the combination thereof and the mode of operation, as will become more apparent from the following description.

In the accompanying drawings,

Figure 1 is a sectional view, partly in elevation, of a lifting mechanism equipped with my invention.

Figure 2 is a section of a portion of the apparatus, on a slightly enlarged scale, showing the connections between the container and the cylinder.

Figure 3 is a fractional detail, partly in section, showing a modified connection between the container and the cylinder.

Figure 4 is a side elevation, partly broken away, showing the invention applied to a different arrangement of container and cylinder.

Figure 5 is a side elevation, partly in section, showing means whereby the invention may be applied to a previously installed lifting mechanism.

Figure 6 is a section taken on the line 6—6 of Figure 5.

Figure 7 is a section taken through the fitting connecting the conduit with the cylinder.

Figure 8 is an elevation of the inner end of said fitting.

In these drawings I have illustrated certain embodiments of my invention showing the same as applied to hydraulic automobile lifts differing in their organiaztion; but it is to be understood that the invention may take various forms and may be applied to lifting mechanisms of various kinds.

In Figures 1 and 2 the invention is shown as applied to an automobile lift comprising a cylinder 10 embedded in the ground with its upper end slightly above ground level. Mounted in this cylinder is a piston 11 on the upper end of which is mounted a load supporting device 12, here shown as one of the runways of a runway type automobile lift. A container, or tank, 13 for propellant liquid, herein called oil, of annular form is mounted about and rigidly secured to the cylinder 10 and is, of course, also embedded in the ground. The container is provided in its bottom wall with an opening 14 which is connected by a conduit 15 with the cylinder. A portion of the conduit 15 extends above ground level and is provided with an oil control valve 16, preferably a gate valve of a known type, which is closed by a spring and opened by a handle 16a. Air under pressure is introduced into the container through a fitting 17 in the top wall thereof which is connected by a pipe 18, which extends above ground, with a valve unit 19. The valve unit comprises an inlet valve 20 connecting the pipe 18 with a pipe 21 which leads from a suitable source of air under pressure, not shown, and also an exhaust valve 22 connecting the pipe 18 with an exhaust line 23. Each valve is of a conventional spring actuated type having a valve stem 24 extending above the body thereof. Pivotally mounted on the valve unit at 25 are two arms 26 rigidly connected one with the other and extending above the respective valve stems 24, each arm having on the upper surface thereof a short projection or knob 27. An actuating lever 28 is pivotally mounted on the valve unit at 29 and has on each side thereof a cam surface 30 adapted to engage the knob 27 on the adjacent arm 26 and depress the same to open the corresponding valve. Each cam surface 30 is of such shape that it moves beyond the knob on the depressed arm and locks the latter in its depressed position until the lever is positively moved in the opposite direction. Thus, by moving the lever 28 to the right, in Figure 1, air is admitted to the container above the liquid therein, and, when the oil control valve 16 is open, forces the liquid through the conduit 15 into the cylinder where it acts upon the piston to move the latter upwardly. The oil valve is retained in its open position until the piston has reached the desired elevation, at which time the handle 16a is released and the valve is automatically closed, thus preventing the flow of oil in either direction and providing a positive hydraulic lock to retain the piston in its elevated position regardless of the positions of the air valves. After the oil control valve is closed and the piston locked in its elevated position, the air supply to the container may be cut off immediately or may be maintained until the piston is to be lowered, at which time the air valve lever 28 is moved to the left, in Figure 1, to open the air exhaust valve and the oil control valve is opened.

The oil conduit 15 comprises a fitting 31 connected with the container adjacent the outlet opening 14 and provided with a cavity 32 in line with the opening 14, and with a valve seat 33 at the outer end of the cavity. An upright tubular guide element 34 is supported in the container 13 with its lower end in line with the valve seat 32. This guide is in open communication with the interior of the container at all levels of the oil therein. Preferably, the tubular guide comprises a cylindrical tube of sheet metal having therein a multiplicity of perforations 35 distributed throughout the length thereof. The lower end of the tube extends into the cavity 32 in the fitting and the tube may be supported in an upright position in any suitable manner. In the present instance a filling tube 36 extends from the surface of the ground into the oil container and is provided at its upper end with a removable closure 37, and the upper end of the guide tube 34 extends into the recessed lower end of the filling tube and is supported thereby in an upright position.

Arranged within the tubular guide is a buoyant ovaloid valve member 38 which floats on the oil in the tubular guide and rises and falls therein as the oil rises and falls in the container, and has at its lower end a part adapted to enter the cavity 32 and engage the valve seat 33 in the conduit 15, thus closing the conduit. So long as the container contains oil in an amount sufficient to fully elevate the piston without emptying the container, the valve member will float on the oil above the valve seat and will not interfere with the flow of oil to the cylinder. When the oil in the container approaches exhaustion, the valve member will be in the lower portion of the guide and the pressure of the air thereon will force the same into firm engagement with the valve seat, thereby automatically closing the conduit and preventing air from passing from the container to the cylinder.

The valve member may be of any suitable construction and, as here shown, it is of hollow cylindrical construction and of a diameter slightly less than the internal diameter of the guide tube and is closed at both ends, the lower end being shaped to conform to the valve seat 33. Preferably, the valve member is of such length and buoyancy that the upper end thereof normally projects a substantial distance above the oil level. It is desirable that the valve member should be as light as is consistent with the necessary buoyancy and that it should be of sufficient rigidity to withstand impact with the valve seat without deformation. In the past, various attempts have been made to produce floats for this purpose. The buoyancy of the valve member must be sufficiently great so that the valve member will float on the oil, so that it will continue to float even though it is subjected to the weight of the air, which is quite considerable when the air is under extremely high pressure, and will continue to float in spite of the fact that the oil flowing out through the valve creates a suction or slight downward draft of the oil directly below the float. Numerous attempts have been made to provide such a float, as for example, a cork encased in a thin shield of metal, which arrangement proved unsatisfactory. Other attempts were made to use aluminum; but due to the high pressure, the walls of aluminum would collapse when subjected to high pressure if the float were sufficiently light, so that when the oil was flowing downwardly out through the valve opening, the float would not be sucked downwardly and seated on the valve.

For this purpose I use a magnesium alloy. If desired, the valve member may have in its upper end a screw threaded socket 39 adapted to receive the screw threaded end of a rod to enable the valve member to be withdrawn from the guide through the filling tube.

The conduit 15 also includes a fitting 40 by which it is connected with a port 41 in the cylinder 10, this port constituting both an inlet and an outlet for the cylinder. It is desirable that the flow of oil from the cylinder to the conduit should be so restricted as to prevent the piston from gaining too great a speed when moving downwardly under a heavy load. For this purpose the fitting is provided with two passages, so controlled that the oil moving from the conduit to the cylinder will flow through both passages, but oil moving from the cylinder to the conduit will flow through one only of said passages. In the arrangement shown in Figures 7 and 8 the interior of the fitting is divided into a an outer chamber and an inner chamber, 42 and 43, by a partition 44 having therethrough two passages 140 and 141. Passage 141 is provided at its inner end with an upwardly and inwardly facing valve seat 142. Extending upwardly and inwardly from the valve seat, toward the port 41 in the cylinder, is a guide in which is mounted a ball valve 143 which, due to the inclination of the guide, is normally in engagement with the valve seat 142; but will be moved from said seat by the pressure of oil flowing from the conduit to the cylinder. The guide is of an open construction, which permits the free flow of oil through the passage 141 to the cylinder when the valve 143 has been moved from its seat. As here shown, it comprises two upright members 144 extending upwardly and outwardly from the inclined lower surface of the inner chamber 43 and having at their upper ends opposed flanges 145 spaced apart a distance less than the diameter of the ball valve. The flanged upper portions of the upright members 144 are spaced from the bottom wall of the inner chamber for a portion of their length. Thus, the oil flowing to the cylinder will unseat the ball valve and will flow about the ball to the cylinder. When the flow of oil to the cylinder is interrupted, the ball valve will reseat itself and the pressure of the oil flowing from the cylinder to the conduit will retain the ball firmly on its seat. Consequently, during the raising of the piston, oil flows from the conduit to the cylinder through both passages; but when the piston is being lowered, the oil flows from the cylinder to the conduit through the passage 140 only, this passage being of such a capacity as to permit the piston to move downwardly at the desired speed.

As long as air pressure on the oil in the container is maintained, it is not essential that the oil control valve 16 should be closed in order to retain the piston in its elevated position, provided a positive lock is not desired, as the air pressure on the oil in the container will retain the piston in its elevated position. Therefore, in installations where a positive hydraulic lock is not required, the oil control valve may be omitted and there is no necessity for extending the conduit 15 above the ground level. In Figure 3 I have shown at 31a a modified form of the fitting 31, which is so arranged that the outlet 14 of the container 13 may be connected with the fitting 40 on the cylinder by an elbow 45 and a short pipe section 46. The cavity and valve seat in the fitting 31a are the same as they are in the fitting 31 and the operation of the low level oil control is not affected, but the raising and lowing of the piston is controlled wholly by the air valves.

It is not essential to the operation of the low level oil control that the container should be mounted on the cylinder or that it should be underground, and in Figure 4 there is shown an arrangement in which the cylinder 47 is embedded in the ground; but the container 48 is supported on the surface of the ground and is spaced a considerable distance from the cylinder. The outlet in the lower end of the container is connected by a conduit 50 with the cylinder 47, the conduit including a fitting 51 having a valve seat 52 to receive the lower end of a perforated tubular guide 53 arranged within the container. A bouyant valve 54 floats in the tubular guide and is adapted to engage the valve seat 52 as the oil in the container approaches exhaustion. In the arrangement shown, the conduit 50 has an upwardly extending U-shaped portion to enable the oil control valve 55 to be located in a position convenient to the operator. The operation is the same as that above described.

In Figures 5 and 6, I have illustrated one means whereby the invention may be applied to a previously installed lifting mechanism. As there shown, the oil container 56 is mounted above ground and an outlet conduit 57 leads from the lower portion of the container to the upper portion of a smaller supplemental container 58. The lower portion of the supplemental container 58 is connected through a conduit 59 with the cylinder 60 of the lift through a fitting 61. The conduit 59 is connected with the supplemental container by a fitting 62 having a cavity and a valve seat 63 similar to those above described. A perforated tubular guide is mounted within the supplemental container and a buoyant valve member 65 floats on the oil in th guide and is guided thereby into engagement with the valve seat 63 as oil in the supplemental container approaches exhaustion. It will be apparent that upon the exhaustion of the oil in the main container 56, the supplemental container will be full of oil and air under pressure will enter the supplemental container from the main container and force the oil out of the supplemental container until the valve member 65 engages the valve seat, after which no air can pass from the supplemental container to the cylinder.

Preferably, the oil entering the supplemental container is separated from the guide by a baffle and in the arrangement shown, the guide is arranged centrally of the cylindrical supplemental container and the conduit 57 enters the latter at one side of the center thereof. A plate 66 extends for the full length of the supplemental container and is secured at its upper and lateral edges to that container, thus forming between the plate, or baffle, and the side wall of the container, a passage through which the oil may pass to the bottom of the container, the oil entering the main body of the container through openings 67 provided by cutting away the lower corners of the plate.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a lifting mechanism, a cylinder, a piston in said cylinder, a main oil container spaced from said cylinder, means for subjecting oil in said container to air pressure, a second oil container, a conduit leading from the lower portion of said main container to the upper portion of said second container, a second conduit leading from the lower portion of said second container to said cylinder, said second conduit having a valve seat adjacent the inlet end thereof, a tubular guide in said second container leading to said valve seat and in open communication with said second container, a baffle separating said guide from the oil entering said second container and having an opening adjacent the lower end thereof, and a buoyant valve member in said guide adapted to float in the oil in said guide and having a part to engage said valve seat when the oil in said second container falls to a low level.

2. In a lifting mechanism comprising a hydraulic cylinder, an oil container, a passage leading from the lower portion of said container to said cylinder, means for introducing air under pressure into said container above said oil to discharge said oil therefrom through said passage to said cylinder, whereby moisture in said air is condensed, accumulates in said container between said oil and said passage and is discharged from said container through said passage in advance of said oil, and a valve seat in said passage adjacent to and facing said container, a light-weight valve of material corrodible by water and adapted to float on said oil in said container at all levels of said oil above a predetermined low level and to engage said valve seat and close said passage when the level of said oil is lowered to said predetermined lower level, and guide means for said valve extending from a point adjacent the normal high level of the oil in said container to a point adjacent said valve seat, said valve being at all times free to float at the upper surface of said oil and out of contact with any water which may have accumulated in said container below said oil.

3. In a lifting mechanism comprising a hydraulic cylinder, an oil container, a passage leading from the lower portion of said container to said cylinder, means for introducing air under pressure into said container above said oil to discharge said oil therefrom through said passage to said cylinder, whereby moisture in said air is condensed, accumulates in said container between said oil and said passage and is discharged from said container through said passage in advance of said oil, and a valve seat in said passage adjacent to and facing said container, a buoyant valve of magnesium adapted to float on said oil in said container at all levels of said oil above a predetermined low level and to engage said valve seat and close said passage when the level of said oil is lowered to said predetermined low level, and guide means for said valve extending from a point adjacent the normal high level of the oil in said container to a point adjacent said valve seat, said valve being at all times free to float at the upper surface of said oil and out of contact with any water which may have accumulated in said container below said oil.

4. In a lifting mechanism comprising a hydraulic cylinder, an oil container, a passage leading from the lower portion of said container to said cylinder, means for introducing air under pressure into said container above said oil to discharge said oil therefrom through said passage to said cylinder, whereby moisture in said air is condensed, accumulates in said container between said oil and said passage and is discharged from said container through said passage in advance of said oil, and a valve seat in said passage adjacent to and facing said container, an elongate buoyant magnesium valve adapted to float on the oil in said container at all levels of said oil above a predetermined level and to engage said valve seat to close said passage when the level of said oil is lowered to said predetermined low level, and guide means extending from a point adjacent the normal high level of the oil in said container to a point adjacent said valve seat to maintain said elongate valve in an upright position at the level of said oil and to guide one end thereof into engagement with said valve seat, said valve being supported at all times out of contact with any water which may have accumulated in said container below said oil.

5. In a lifting mechanism comprising a hydraulic cylinder, an oil container, a passage leading from the lower portion of said container to said cylinder, means for introducing air under pressure into said container above said oil to discharge said oil therefrom through said passage to said cylinder, whereby moisture in said air is condensed, accumulates in said container between said oil and said passage and is discharged from said container through said passage in advance of said oil, and a valve seat in said passage adjacent to and facing said container, a tubular guide extending from the point adjacent the normal high level of the oil in said container to a point adjacent said valve seat and provided throughout substantially its entire length with perforations to maintain the oil therein at the same level as the oil in said container, a buoyant light-weight valve adapted to float on the oil in said guide at all levels of the oil in said container above a predetermined low level and to engage said valve seat and close said passage when the level of said oil is lowered to said predetermined level, said valve being supported at all times by said oil out of contact with any water which may have accumulated in said container below said oil.

6. A lifting mechanism including a cylinder, a piston in said cylinder, a main oil container spaced from said cylinder, means for subjecting oil in said container to air pressure, a second oil container, a conduit leading from the lower portion of said main oil container to said second container, a second conduit leading from the lower portion of said second container to said cylinder, said second conduit having a valve seat adjacent the inlet end thereof, a guide in said second container extending from the normal high level of the oil therein to said valve seat and in open communication with said second container, said lifting mechanism being characterized by a hollow magnesium valve member in said guide adapted to float on the oil in said guide at all levels of the oil in said second container and having a part to engage said valve seat when the oil in said second container falls to a predetermined low level, the walls of the valve member being sufficiently strong to withstand the air pressure supplied to the oil.

7. A lifting mechanism including a cylinder, a piston in said cylinder, a main oil container spaced from said cylinder, means for subjecting oil in said container to air pressure, a second oil container having an opening in the lower portion thereof, a conduit leading from the lower portion of said main container to said second container, a second conduit connecting the opening in said second container with said cylinder, said second conduit having a valve seat adjacent to and in line with said opening, said lifting mechanism being characterized by a hollow magnesium valve member adapted to float on the oil in said second container at all levels of the oil therein and having a part to extend through said opening and engage said valve seat when the oil in said second container falls to a predetermined low level, the walls of the valve member being sufficiently strong to withstand the air pressure used, and means in said second container to guide said valve member into engagement with said valve seat.

8. A lifting mechanism including a cylinder, a piston in said cylinder, an oil container spaced from said piston and having an opening in the lower portion thereof, a conduit connecting said opening with said cylinder, means for subjecting the oil in said container to air pressure to discharge the same through said conduit, said conduit having a valve seat adjacent the opening in said container, said lifting mechanism including a hollow magnesium valve adapted to float on the oil in said container and having a part to engage said valve seat when the oil in said container is lowered to a predetermined level, the walls of the magnesium valve being sufficiently strong to withstand the pressure used, and means in said container for guiding said valve to said valve seat as the level of the oil in said container is lowered, said valve being free to float at the level of the oil in said container as long as the oil is above said predetermined low level and to move into engagement with said valve seat when the oil in said container falls to said predetermined low level.

9. A lifting mechanism including a cylinder, a piston in said cylinder, an oil container spaced from said piston and having an opening in the lower portion thereof, a conduit connecting said opening with said cylinder, means for subjecting the oil in said container to air pressure to discharge the same through said conduit, said conduit including a fitting secured to the exterior of said container and having therein a cavity in line with said opening, and a valve seat adjacent the outer end of said cavity, said lifting mechanism being characterized by a hollow magnesium valve adapted to float on the oil in said container and to rise and fall with said oil at all levels thereof above a predetermined low level, said valve having a part to enter said cavity and engage said valve seat when the level of the oil in said container falls to said predetermined low level, the walls of the valve being sufficiently strong to withstand the pressure used, and means in said container to guide said valve into said cavity as said oil falls to said predetermined low level.

10. A lifting mechanism including a cylinder, a piston in said cylinder, an oil container spaced from said piston and having an opening in the lower portion thereof, a conduit connecting said opening with said cylinder, means for subjecting the oil in said container to air pressure to discharge the same through said conduit, said conduit including a fitting secured to the exterior of said container and having therein a cavity in line with said opening and a valve seat adjacent the outer end of said cavity, said lifting mechanism being characterized by a hollow magnesium valve adapted to float on the oil in said container and to rise and fall with said oil at all levels thereof above a predetermined low level, said valve having a part adapted to enter said cavity and to engage said valve seat when the level of the oil in said container falls to said predetermined low level, the walls of the valve being sufficiently strong to withstand the pressure used, an upright tubular guide for said valve in said container extending from a point adjacent the normal high level of the oil in said container to a point adjacent said cavity, said tubular guide being in open communication with said container to maintain the oil therein at the same level as the oil in said container.

11. A lifting mechanism including a cylinder, a piston in said cylinder, an oil container spaced from said piston and having an opening in the lower portion thereof, a conduit connecting said opening with said cylinder, means for subjecting the oil in said container to air pressure to discharge the same through said conduit, said conduit having a valve seat adjacent to and in line with said opening in said container, an upright tubular guide in said container leading to said opening and having communication with said container at all levels of the oil therein to maintain the oil in said guide at the same level as the oil in said container, said lifting mechanism being characterized by a hollow magnesium valve freely movable in said guide and having a part to engage said valve seat and close said conduit when the level of the oil in said container falls to a predetermined low level, the walls of the valve being sufficiently strong to withstand the pressures used, said guide extending from a point adjacent said valve seat to a point adjacent the normal high level of the oil in said container, and said valve being free to float at the level of the oil in said container until said oil falls to said predetermined low level and to then move into engagement with said valve seat.

12. A float for use in a hydraulic lift mechanism utilizing oil actuated by compressed air for raising and lowering the lift, said float consisting of an ovaloid member having magnesium walls, the side wall of which is flattened, the weight of the float being less than the weight of the oil displaced by the float, the walls of the float being sufficiently strong to withstand the air pressure required to raise the lift.

13. A float according to claim 12, wherein the float is oblong, a portion of the wall of the float being substantially cylindrical.

14. In a lifting mechanism comprising a hydraulic cylinder, an oil container, a passage leading from the lower portion of said container to said cylinder, means for introducing air under pressure into said container above said oil to discharge said oil therefrom through said passage to said cylinder, a valve seat in said passage adjacent to and facing said container, a magnesium float valve adapted to float on said oil in said container at all levels of said oil above a predetermined low level and to engage said valve seat and close said passage when the level of said oil is lowered to said predetermined low level, and guide means for said magnesium float valve extending from a point adjacent the normal high level of the oil in said container to a point adjacent said valve seat, said float valve being at all times free to float at the upper surface of said oil.

References Cited in the file of this patent

UNITED STATES PATENTS

| | | |
|---|---|---|
| 220,479 | Johnson et al. | Oct. 14, 1879 |
| 763,115 | Robinson | June 21, 1904 |
| 1,140,666 | Cummings | May 25, 1915 |
| 2,013,999 | Hutt | Sept. 10, 1935 |
| 2,151,057 | Suth | Mar. 21, 1939 |
| 2,336,817 | Thompson | Dec. 14, 1943 |
| 2,402,265 | Thompson | June 18, 1946 |
| 2,524,237 | Smith | Oct. 3, 1950 |

FOREIGN PATENTS

| | | |
|---|---|---|
| 6,140 | Great Britain | Mar. 25, 1895 |